United States Patent
Krahn et al.

(10) Patent No.: US 9,623,570 B1
(45) Date of Patent: Apr. 18, 2017

(54) GRIPPING DEVICE

(71) Applicants: Jeffrey M. Krahn, Vancouver Coquitlam (CA); Carlo Menon, Vancouver Coquitlam (CA); Francesco Fabbro, Magnano in Riviera (IT); Enrico Bovero, Port Coquitlam (CA)

(72) Inventors: Jeffrey M. Krahn, Vancouver Coquitlam (CA); Carlo Menon, Vancouver Coquitlam (CA); Francesco Fabbro, Magnano in Riviera (IT); Enrico Bovero, Port Coquitlam (CA)

( * ) Notice: Subject to any disclaimer, the term of this patent is extended or adjusted under 35 U.S.C. 154(b) by 0 days.

(21) Appl. No.: 14/637,393

(22) Filed: Mar. 3, 2015

Related U.S. Application Data (60) Provisional application No. 61/947,039, filed on Mar. 3, 2014.

(51) Int. Cl.
    *B66C 1/42* (2006.01)
    *B25J 15/00* (2006.01)

(52) U.S. Cl.
    CPC ......... *B25J 15/0023* (2013.01); *B25J 15/008* (2013.01); *B25J 15/0085* (2013.01)

(58) Field of Classification Search
    CPC .. B25J 15/0023; B25J 15/008; B25J 15/0085; B25J 15/0019; B25J 15/0047; B25J 15/0033
    USPC .... 294/86.4, 119.3, 93, 98.1, 192, 195, 196, 294/208
    See application file for complete search history.

(56) References Cited

U.S. PATENT DOCUMENTS

| | | | | |
|---|---|---|---|---|
| 4,168,073 A | * | 9/1979 | LaRue | B23B 31/1175 242/572 |
| 4,770,456 A | * | 9/1988 | Phillips | B25J 15/00 279/2.17 |
| 6,846,029 B1 | * | 1/2005 | Ragner | B25B 9/00 294/219 |
| 7,475,927 B2 | * | 1/2009 | Maffeis | B25J 15/12 279/2.17 |
| 8,511,730 B2 | * | 8/2013 | Goudy | B65G 47/908 294/195 |
| 8,882,165 B2 | * | 11/2014 | Lipson | B25J 15/0023 294/188 |
| 2007/0241578 A1 | * | 10/2007 | Maffeis | B25J 15/12 294/93 |
| 2010/0054903 A1 | * | 3/2010 | Jones | B66C 1/445 414/800 |
| 2010/0217436 A1 | * | 8/2010 | Jones | B25J 5/005 700/245 |
| 2013/0106127 A1 | * | 5/2013 | Lipson | B25J 15/0023 294/189 |

* cited by examiner

*Primary Examiner* — Gabriela Puig
(74) *Attorney, Agent, or Firm* — Kafantaris Law Offices; Theo Kafantaris (57) ABSTRACT

A device in which the gripping action is achieved by a compliant membrane that adapts itself to the object to be lifted and then maintains such shape throughout the displacement of the object. The gripping force provided by the present invention is best suited for delicate objects, as it gently applies the gripping force necessary for displacement. This is accomplished through a chamber, a deformable membrane delimiting the chamber partially or entirely, and a means for changing the volume or shape of the chamber determined by the deformation of the membrane.

16 Claims, 9 Drawing Sheets

GRIPPING DEVICE

CROSS-REFERENCE TO RELATED APPLICATIONS

This application claims the benefit of U.S. Provisional Patent Application No. 61/947,039, filed on Mar. 3, 2014, and incorporated herein by reference.

STATEMENT REGARDING FEDERALLY SPONSORED RESEARCH AND DEVELOPMENT

Not Applicable.

FIELD OF THE INVENTION

This invention relates generally to a gripping device, and more particularly, to a passive-active gripping and releasing apparatus.

DISCUSSION OF RELATED ART

Generally, robotics can be described as automating laborious and repetitive activities, typically replacing those of a human laborer. Robotic gripping devices can generally be described as devices adapted to grip, lift, and otherwise displace a variety of target objects having different sizes and shapes. An active robotic gripping device typically has two or more parts adapted to apply a controlled pressure sufficient to lift a target object, much like a human arm. The main disadvantage of traditional active robotic gripping devices is that the moving parts needs to be carefully adjusted to adapt to the specific shape and size of each target object.

Other robotic gripping devices utilize negative pressure to lift their target objects. For example, suction cup solutions or vacuum end effectors are both widely used in the automation industry. The rigidity of the above robotic gripping devices are often problematic when dealing with soft and delicate target objects, such as horticultural products.

US 2013/0106127 describes a passive universal jamming gripping device, where a membrane is filled with a granular material such as sand, pushed onto the object, and then hardened by applying vacuum within the chamber. While this is one possible solution for working with target objects, the need of a granular material and a pumping mechanism to create depression inside the chamber adds complexity and cost to the apparatus.

While several robotic gripping devices exist in the prior art, none are adapted to simply and efficiently work with delicate objects. The complexity needed to render such devices suitable for delicate operations determines substantial increase in costs and operation times. As such, there is a continued need for a device in which the gripping action is achieved by a compliant membrane that adapts itself to the object to be lifted and then maintains such shape throughout the displacement of the object. Furthermore, there is a continued need for a device which is simple and effective in its operation and implementation. The present invention satisfies these needs.

SUMMARY OF THE INVENTION

The present invention will provide a device in which the gripping action is achieved by a compliant membrane that adapts itself to the object to be lifted and then maintains such shape throughout the displacement of the object. The gripping force provided by the present invention is best suited for delicate objects, as it gently applies the gripping force necessary for displacement. This is accomplished through a chamber, a deformable membrane delimiting the chamber partially or entirely, and a means for changing the volume or shape of the chamber determined by the deformation of the membrane.

The present invention comprises a chamber, a deformable membrane delimiting the chamber partially or entirely, and a means for changing the volume or shape of the chamber determined by the deformation of the membrane. The means for changing the volume or shape of the chamber include a piston and/or a phase-changing material. These elements work in conjunction to provide grip onto an object, or more specifically, by deforming the membrane such that it provides the grip necessary to lift and displace the object. The shape of the membrane will be maintained throughout the displacement of the object.

These and other objectives of the present invention will become obvious to those of ordinary skill in the art after reading the following detailed description of the preferred embodiments. It is to be understood that the foregoing general description and the following detailed description are exemplary, and are intended to provide further explanation of the invention as claimed.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list.

In the preferred embodiment, the present invention comprises a chamber 20, a deformable membrane 30 delimiting the chamber 20 partially or entirely, and a means for changing the volume or shape of the chamber 20 determined by the deformation of the membrane 30. The means for changing the volume or shape of the chamber 20 include a piston 40 and/or a phase-changing material 41. These elements work in conjunction to provide grip onto an object, or more specifically, by deforming the membrane 30 such that it provides the grip necessary to lift and displace the object. The shape of the membrane 30 will be maintained throughout the displacement of the object.

The chamber 20 further comprises a void which may contain a gas, liquid, or phase-changing material 41. In the preferred embodiment, the chamber 20 will have an open end 22 and a closed end 21, sealed by the deformable membrane 30. As such, the chamber 20 will have a fixed volume, wherein the deformation of the membrane 30 does not cause a change in this volume. In an alternative embodiment, the chamber 20 can be open. In this embodiment, the deformation of the membrane 30 does cause a change in volume of the chamber 20. In a further alternative embodiment, the chamber 20 may further comprise a valve 23.

The membrane 30 will come into direct contact with the object, providing the necessary grip to displace the object. Furthermore, the membrane 30 will seal the chamber 20 and maintain a fixed volume even when deformed. As such, the membrane 30 must be a stretchable, yet resistant, material that is capable of providing substantial grip (static friction). Suitable materials include latex, silicones, polyurethanes, and other types of stretchable polymers or materials. The surface of the membrane 30 can be smooth to better comply with smooth objects, or structured for objects with a rougher surface. The adhesion between the membrane 30 and the object to be displaced is partially due to the pressure acted by the membrane 30 as a result of its deformation in proximity of the object and partially due to dry adhesion mechanisms. Dry adhesion is based on van der Waals forces created at the surface of the membrane 30. These van der Waals forces, based on electric dipole interactions, can be enhanced by means of electro dry adhesion. As such, electro dry adhesion can increase the preload of the membrane by exerting an electric force toward the object to be lifted. For this purpose, electrodes can be embedded into the membrane 30 and charged accordingly to increase the preload and to reduce the pressure applied on the object by the membrane.

More specifically, the membrane 30 may be specifically designed to provide attractive and/or repellant forces independent of its deformation. Here, the membrane 30 will further comprise a micro-featured surface adapted to provide dry adhesion, and at least one conductive material adapted to provide electrostatic adhesion. A voltage is applied to the conductive material(s), providing an attractive force to self-preload said micro-featured surface, a resistive force to self-peel said micro-featured surface, or alternating said voltage to self-clean said micro-featured surface. The membrane may comprise a conductive polymer, rubber or silicone rubber or a composite polymer, rubber, or silicone rubber material with embedded conductive particles such as carbon black, carbon nanotubes, silver particles, or other conductive materials, and one electrode.

In the preferred embodiment, the means for changing the volume or shape of the chamber 20 comprises a piston 40. The piston 40 will be positioned on the closed end 21 of the chamber 20 and will change the volume within the chamber 20. More specifically, the piston 40 will create either a positive or negative pressure within the chamber 20, thereby deforming the membrane 30. The piston 40 may or may not be attached to the membrane 30. The deformation of the membrane 30 will be maintained as the object is displaced through the controlled position of the piston 40. The piston 40 may further include piston seals to prevent any gas, liquid, or phase-changing material 41 from escaping. The piston 40 will move linearly and can also be positioned on the sides of the chamber 20. The piston 40 may further comprise a positioning sensor 142 at its distal end 42 for detecting and positioning the device relative to the designated object.

In an alternative embodiment, the means for changing the volume or shape of the chamber 20 comprises a phase-changing material 41. Here, the chamber 20 will be filled with the phase-changing material 41, which will have a gaseous state and a liquid state. A flux of the phase-changing material 41 will deform the membrane. Just as before, the deformation of the membrane is maintained through the controlled flux of the phase-changing material. In a further alternative embodiment, both the piston 40 and the phase-changing material 41 may be used in conjunction to deform the membrane and maintain this deformation.

Figure 1:
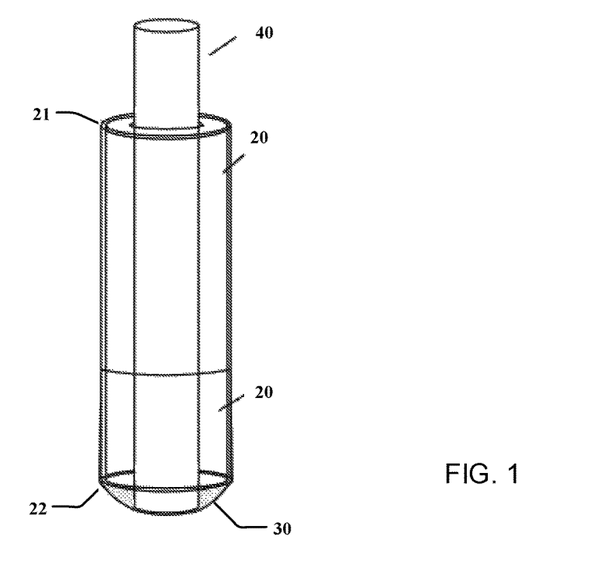
FIG. 1 is a front perspective view of the present invention.
Figure 2:
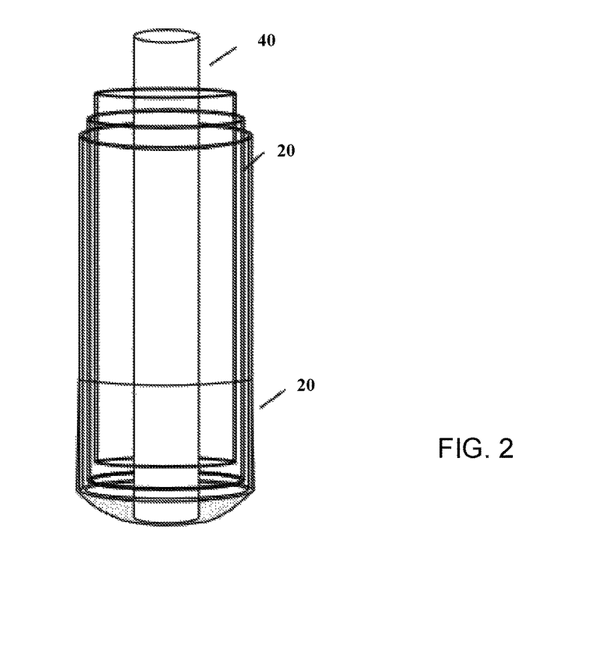
FIG. 2 is a front perspective view of the present invention.
Figure 3:
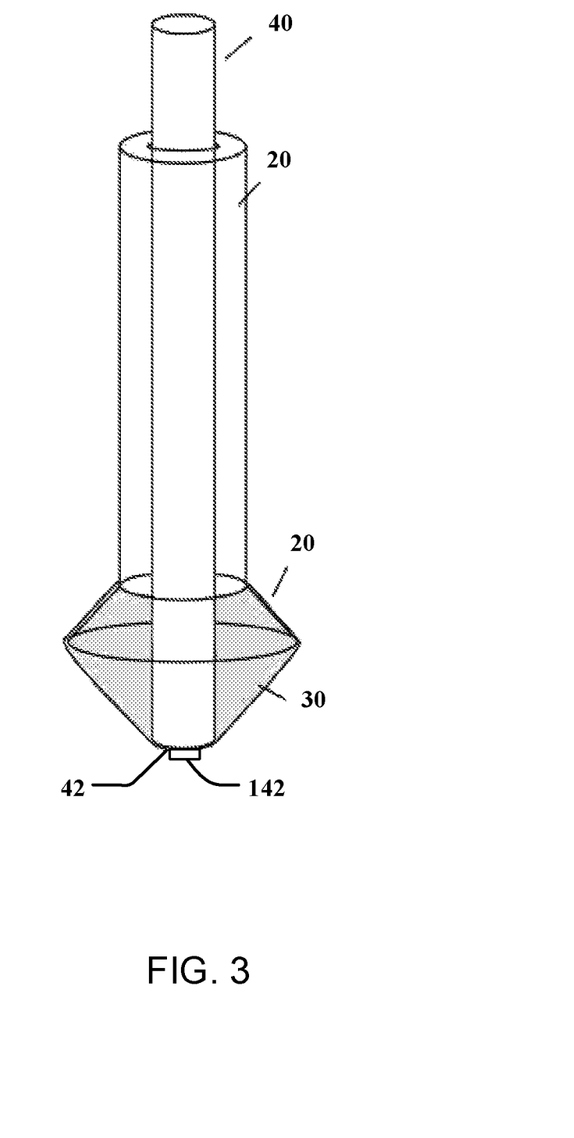
FIG. 3 is a front perspective view of the present invention.
Figure 4:
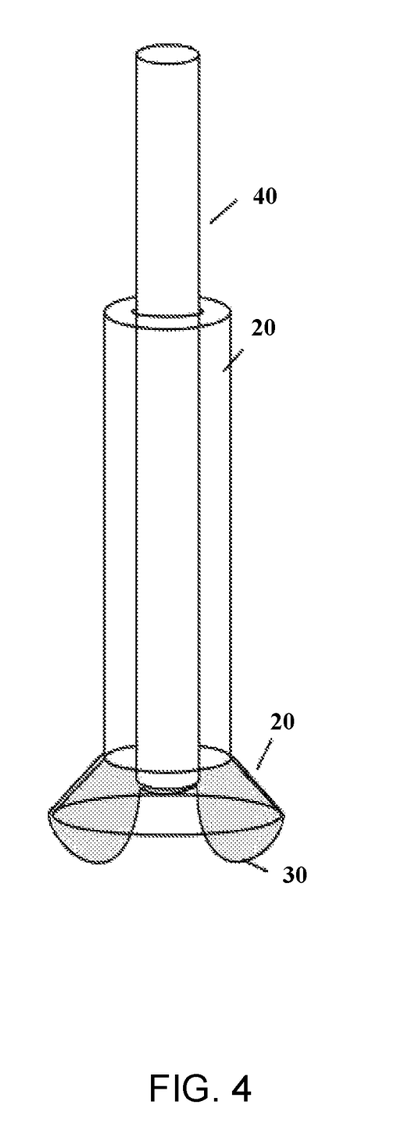
FIG. 4 is a front perspective view of the present invention.

FIGS. 1-5 illustrates an embodiment where the piston 40 is attached to the membrane 30 directly. In FIG. 1, the deformation of the membrane 30 is maintained by the piston 40 itself. FIG. 2 further comprises concentric chambers 20 such that the area of the membrane 30 in contact with the object can be better controlled. FIGS. 3 and 4 illustrate the chamber 20 having a conical shape for better engaging the object to be displaced. More specifically, FIG. 3 illustrates the device where the piston 40 is projected outward as it approaches to the object to be displaced. FIG. 4 represents the same embodiment with the piston 40 withdrawn, engaging the object and providing the necessary grip for displacement.

Figure 5:
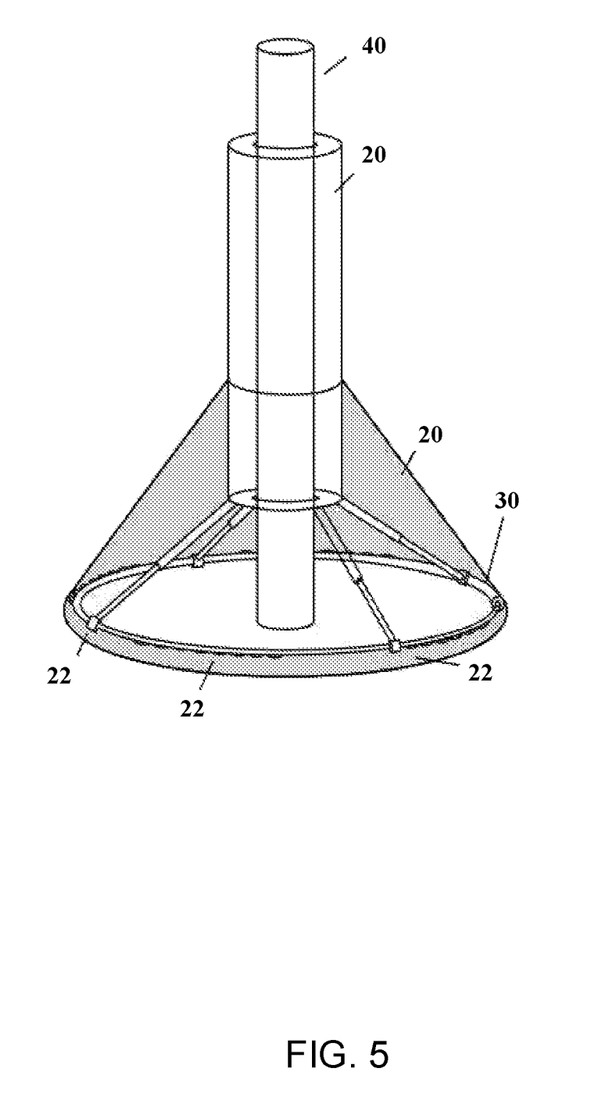
FIG. 5 is a front perspective view of the present invention.

In FIG. 4, the bulging of the membrane 30 determines that a positive pressure is being applied, and as such, the gripping force can be measured and adjusted by monitoring the pressure within the chamber 20. Alternatively, when the object to be lifted presents a surface of contact which is much larger that the size of the membrane 30, the same mechanism of action might determine grip through a mechanism similar to a suction cup, determined by the decreased pressure in the region immediately below the piston 40 between the membrane 30 and the designated object. FIG. 5 represents a more complex embodiment in which the open end 22 of the chamber 20 is determined by a ring with an adjustable diameter.

FIGS. 6-10 illustrate the valve 23 which will control the flux of a gas or a phase-changing material 41. In these embodiments, the piston 40 is not attached directly to the membrane 30. Here, the deformation of the chamber 20 is maintained through the flux of the gas or the phase-changing material 41 in and out of the chamber 20, but can also include additional deformation from the movement of the piston 40.

While FIGS. 1-5 illustrate embodiments where the piston 40 is directly attached to the membrane 30, thereby directly deforming the membrane 30, FIGS. 6-10 illustrate embodiments where the piston 40 is not directly attached to the membrane 30. Here, the deformation of the membrane 30 is maintained through the pressure exerted on it by a gas (such as air) or by a phase-changing material 41 within the chamber 20. As such, all embodiments, including FIGS. 1-5, may operate with or without the piston 40 directly attached to the membrane 30. Conversely, embodiments illustrated in FIGS. 1-5 may also include a valve 23.

Figure 6:
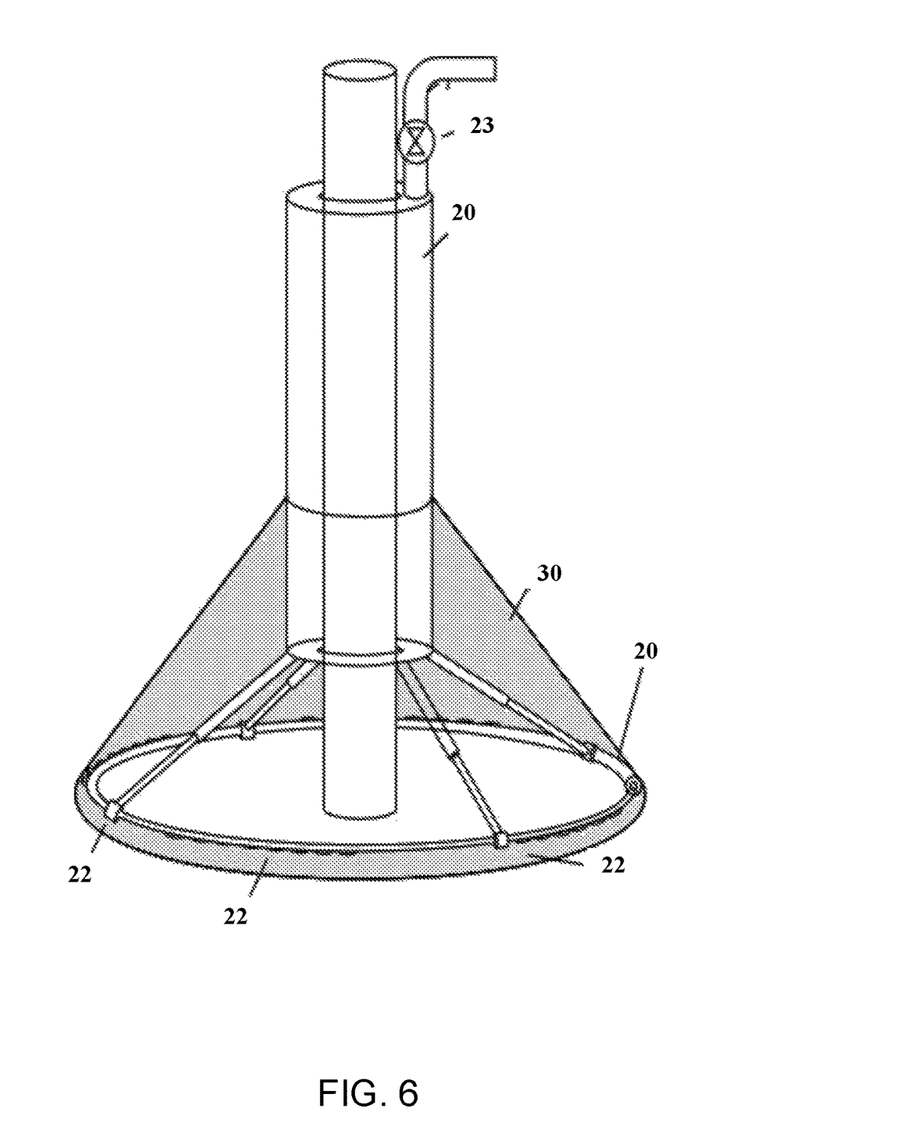
FIG. 6 is a front perspective view of the present invention.
Figure 7:
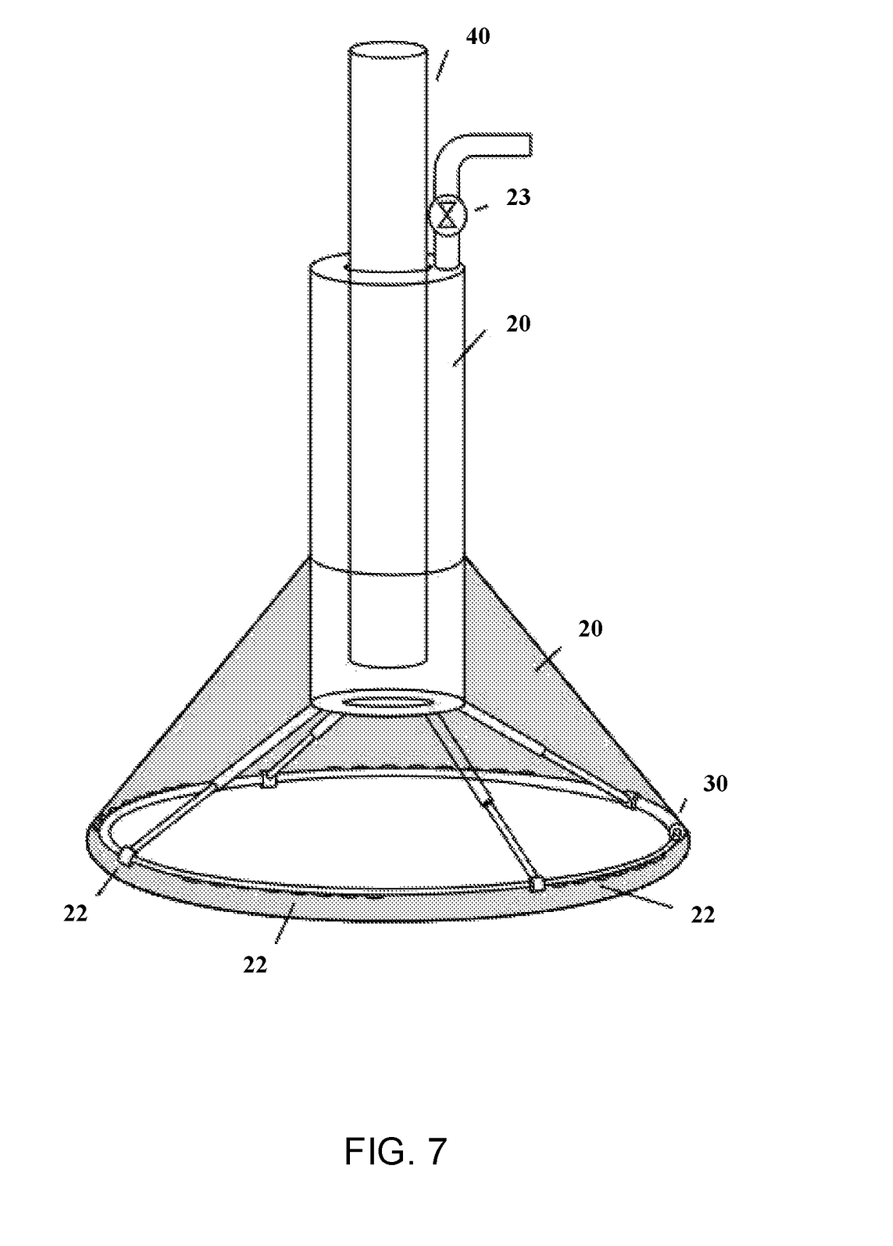
FIG. 7 is a front perspective view of the present invention.
Figure 8:
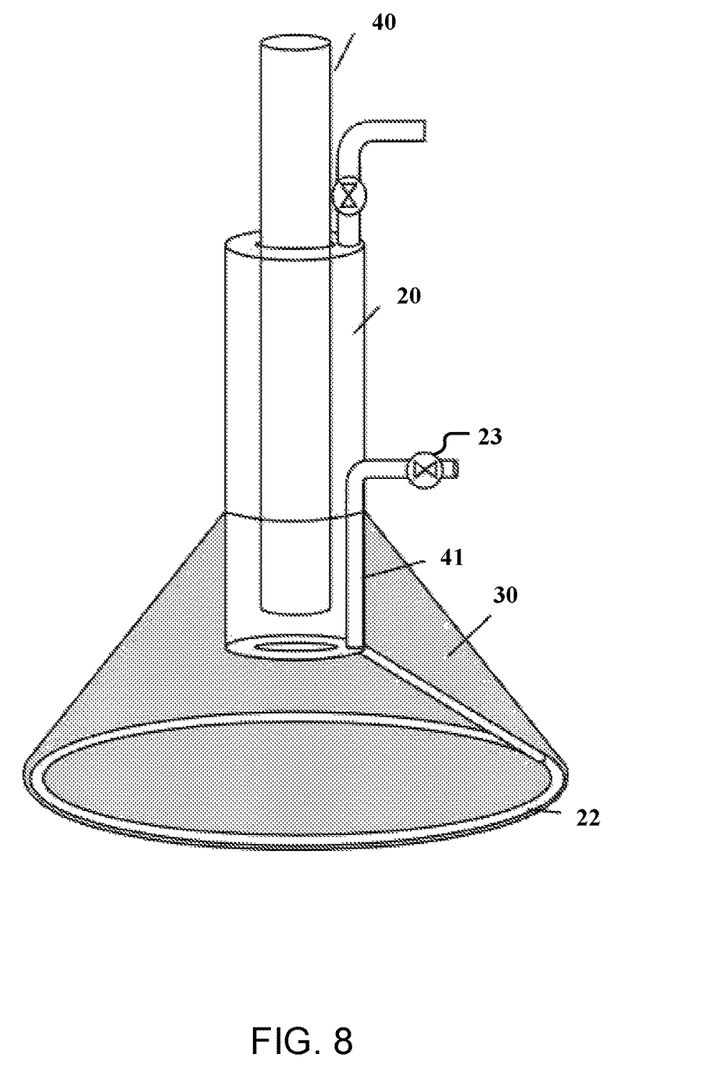
FIG. 8 is a front perspective view of the present invention.
Figure 9:
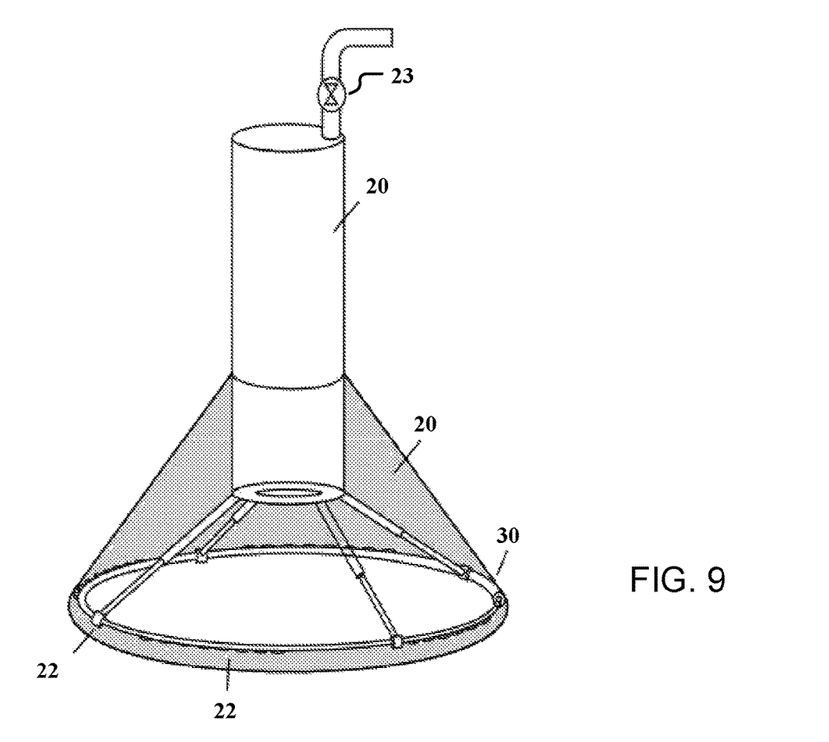
FIG. 9 is a front perspective view of the present invention.
Figure 10:
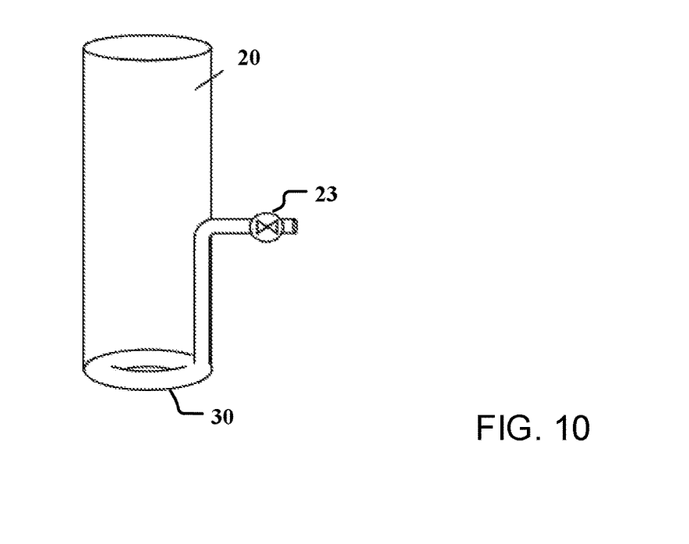
FIG. 10 is a front perspective view of the present invention.

FIGS. 6-7 illustrates just such an embodiment, where the embodiment illustrated in FIG. 5 further includes a valve 23. The presence of a piston 40 and a valve 23 to regulate the pressure inside the chamber 20 is one of the most advantageous configurations, as it allows the device to have a more precise control over the deformation of the membrane 30 and the pressure exerted on the object to be displaced. FIG. 6 illustrates the piston 40 projected outward toward the designated object, while FIG. 7 illustrates the piston 40 withdrawn. FIG. 8 illustrates a second valve for introducing and/or releasing gas or phase-changing material 41 into the chamber 20. FIGS. 9-10 illustrate embodiments without a piston 40, relying only on gas or phase-changing material 41 for deforming the membrane 30.

Figure 11:
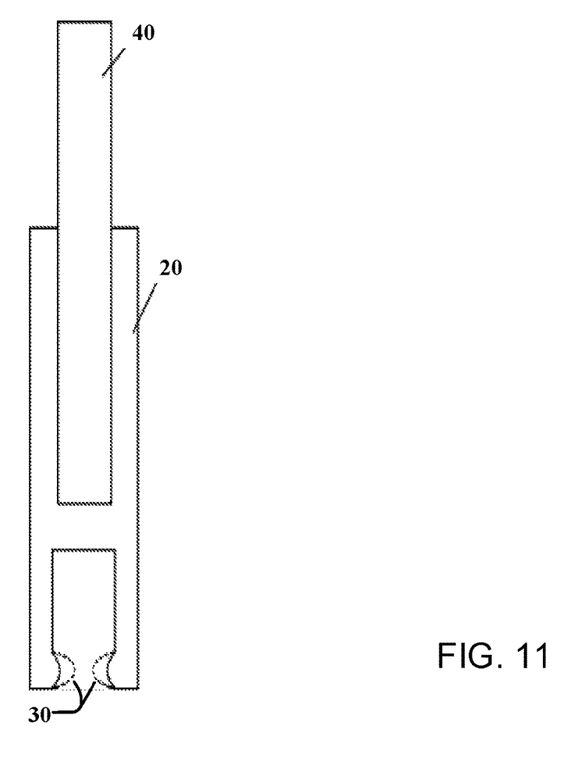
FIG. 11 is a front perspective view of the present invention.
Figure 12:
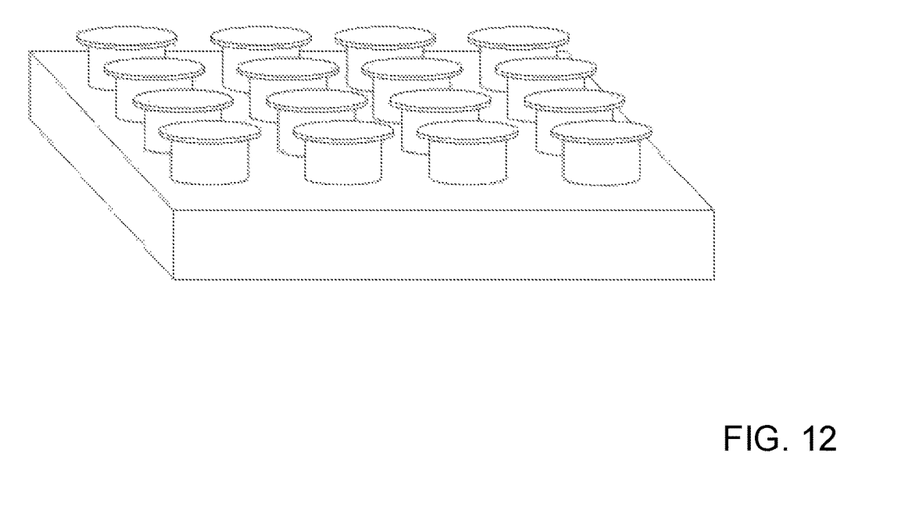
FIG. 12 is a front perspective view of various objects to be displaced.

FIG. 11 illustrates an embodiment where there is no need of solid walls within the chamber 20. This embodiment can also be mirrored in FIGS. 6-10. Here, the chamber 20 will be first filled with the phase-change material 41 in its fluid state so that the membrane 30 can passively comply with the object to be displaced. During this phase, the valve 23 can be opened to allow the flux of phase-change material 41 into or out of the chamber 20, if a volume change of the membrane 30 is needed. Once the maximum area of contact has been established, the phase-changing material 41 will be converted to its solid form in order to maintain the deformation and position of the membrane 30 throughout the displacement of the object. Finally once the destination has been reached, in order to disengage the object, the phase-changing material 41 would be again converted to its fluid phase and the membrane 30 allowed detaching from the object.

The adaptability of the membrane 30 allows for the displacement of objects of different sizes with the same size of membrane and apparatus. However, an increased range of application is reached by employing an adaptable open end 22 of the chamber 20. To achieve such adaptability, several alternative embodiments may be used. First, as illustrated in FIG. 2, a series of concentric cylinders 20 can be used, which allow handling a larger size distribution of objects. However, they might constitute an obstacle if the objects to be displaced are close to each other, especially in the configuration utilizing the smaller cylinder 20.

Alternatively, and as illustrated in FIGS. 5-11, the perimeter of the open end 22 may have a variable diameter. This is achieved with a ring made of a circular cylinder which is able to slide into itself or around itself. The control of the ring's size can be achieve through extensible pods, through which the ring is attached to the chamber 20 or in any other way that would uniformly modulate the ring's size. As the membrane 30 is in contact with the chamber 20, it is possible to facilitate its extension by placing wheels or ball bearings along the ring such that the increase or decrease in size of the ring does not cause the membrane 30 to stretch or shrink non-uniformly, thus causing unwanted stress on it or undesirable regions where the membrane 30 responds differently.

In a further alternative embodiment, the ring may be made of a uniformly deformable material such as an inflatable tube or rubber ring. This embodiment is illustrated in FIGS. 8, 10, & 11. In this embodiment, the increase in diameter of the ring is constant at every point, and as such, no further system is needed to maintain a constant strain of the membrane 30. The inflatable tube is designed in such a way that the flux of air into or from it regulates the diameter of the ring formed by the tube.

In yet a further alternative embodiment, a conical shape of the open end 22 of the chamber 20 can be used, as shown in FIGS. 3-4. Here, an object can be approached without disturbing the neighboring objects. In this particular scenario, the shape of the cone trunk can be interchangeable to be able to adapt to a wide variety of objects maintaining the same apparatus. In this embodiment, however, the membrane 30 is secured to the outside edges of the open end 22 to avoid its bulging outward, potentially interfering with neighboring objects.

While the above description contains specific details regarding certain elements, sizes, and other teachings, it is understood that embodiments of the invention or any combination of them may be practiced without these specific details. Specifically, although certain materials are designated in the above embodiments, any suitable materials may be used. These details should not be construed as limitations on the scope of any embodiment, but merely as exemplifications of the presently preferred embodiments. In other instances, well known structures, elements, and techniques have not been shown to clearly explain the details of the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:
1. A gripping device comprising:
   a chamber having an open end;
   a deformable membrane sealing said open end; and
   a piston for changing the volume within said chamber;
   wherein said change in volume will create positive or negative pressure within said chamber, deforming said membrane through the motion of said piston, providing gripping and attractive forces.
2. The device of claim 1, wherein the deformation of said membrane is maintained through the controlled position of said piston.

3. The device of claim 2, wherein the deformation of said membrane is further maintained through the controlled flux of a gas or a liquid within said chamber.

4. The device of claim 3, further comprising a valve for further maintaining the controlled flux of said gas or liquid within said chamber.

5. The device of claim 3, wherein said gas or liquid further comprises a phase-changing material within said chamber, said phase-changing material having a gaseous state and a liquid state.

6. The device of claim 1, wherein said piston further comprises linear motion.

7. The device of claim 6, wherein said piston is positioned opposite said membrane, wherein said linear motion is in the direction of lifting.

8. The device of claim 1, wherein said piston is positioned adjacent to said membrane.

9. The device of claim 1, wherein said piston is attached to said membrane.

10. The device of claim 1, wherein said piston further comprises a positioning sensor at its distal end.

11. The device of claim 1, wherein said deformable membrane further comprises a micro-featured surface adapted to provide dry adhesion.

12. The device of claim 1, wherein said deformable membrane further comprises at least one conductive material adapted to provide electrostatic adhesion.

13. The device of claim 1, wherein said open end further comprises an adjustable diameter.

14. A method of gripping an object, comprising:
 positioning the open end of a chamber adjacent to said object, said chamber further comprising a deformable membrane sealing an open end;
 deforming said membrane about said object;
 wherein said deforming of said membrane will grip said object; and further comprising a piston for changing the volume within said chamber, wherein the deformation of said membrane is maintained through the controlled position of said piston.

15. The method of claim 14, further comprising a gas or liquid within said chamber, wherein the deformation of said membrane is maintained through the controlled flux of said gas or liquid.

16. The method of claim 15, wherein said gas or liquid further comprises a phase-changing material, said phase-changing material having a gaseous state and a liquid state, wherein the deformation of said membrane is maintained through the controlled flux of said phase-changing material.

* * * * *